United States Patent [19]

Svetkoff et al.

[11] Patent Number: 4,796,997

[45] Date of Patent: Jan. 10, 1989

[54] METHOD AND SYSTEM FOR HIGH-SPEED, 3-D IMAGING OF AN OBJECT AT A VISION STATION

[75] Inventors: Donald J. Svetkoff; Brian Doss, both of Ann Arbor; David N. Smith, South Lyons, all of Mich.

[73] Assignee: Synthetic Vision Systems, Inc., Ann Arbor, Mich.

[21] Appl. No.: 52,841

[22] Filed: May 21, 1987

Related U.S. Application Data

[63] Continuation-in-part of Ser. No. 866,735, May 27, 1986, abandoned.

[51] Int. Cl.⁴ .............................................. G01B 11/03
[52] U.S. Cl. ........................................ 356/376; 356/1
[58] Field of Search ........................... 356/1, 375, 376

[56] References Cited

U.S. PATENT DOCUMENTS

| | | |
|---|---|---|
| 4,040,738 | 8/1977 | Wagner ..................... 356/1 |
| 4,355,904 | 10/1982 | Balasubramanian ............ 356/376 |
| 4,514,083 | 4/1985 | Fukuoka ..................... 356/1 |
| 4,558,949 | 12/1985 | Uehara et al. ............... 356/1 |
| 4,643,578 | 2/1987 | Stern ....................... 356/1 |
| 4,677,302 | 6/1987 | Chiu et al. ................. 356/376 |

FOREIGN PATENT DOCUMENTS

| | | |
|---|---|---|
| 0195405 | 3/1986 | European Pat. Off. . |
| 0208094 | 1/1987 | European Pat. Off. . |
| 3319320 | 11/1984 | Fed. Rep. of Germany .......... 356/1 |
| 165704 | 10/1982 | Japan ...................... 356/376 |
| 34313 | 2/1983 | Japan ...................... 356/1 |
| 81/02628 | 9/1981 | PCT Int'l Appl. . |

Primary Examiner—Richard A. Rosenberger
Attorney, Agent, or Firm—Brooks & Kushman

[57] ABSTRACT

A method and system for high-speed, 3-D imaging of an object at a vision station including a flying spot laser scanner, a dynamically configurable spatial filter and a diffuser for spatial averaging, are used in conjunction with a variable transmission filter in an optical depth sensing system. The reflected laser signal received by the sensing system is first spatially filtered and averaged and then split into first and second beams which are imaged onto a pair of highly sensitive photodetectors which introduce capability for high-speed, 3-D sensing under low light level conditions. The first beam passes through a variable transmission filter which is used to encode position which, in turn, is proportional to the height of the object. The second or reference split beam is provided to compensate for changes in the reflectance of the object and the power of the laser scanner. A high-speed signal processing unit which incorporates special circuitry to greatly extend dynamic range computes the ratio of the transmitted signal to the sum of the reference signal and the transmitted signal to determine height information. The signal processing unit also contains noise rejection circuitry which is activated during "off" and "on" periods of laser diode TTL modulation and includes feedback control for pulse amplitude modulation of the laser diode source if necessary to increase dynamic range of the system.

31 Claims, 5 Drawing Sheets

$$z = \frac{B}{\text{TAN } \theta_P + \text{TAN } \theta_p}, \quad \theta_P = \text{TAN } \theta_P = \frac{\Delta x_p}{F},$$
$$x = z \text{ TAN } \theta_P$$

METHOD AND SYSTEM FOR HIGH-SPEED, 3-D IMAGING OF AN OBJECT AT A VISION STATION

This application is a continuation-in-part application of U.S. patent application Ser. No. 866,735, filed May 27, 1986, now abandoned.

TECHNICAL FIELD

This invention relates to method and apparatus for imaging an object at a vision station to develop dimensional information associated with the object and, in particular, to method and apparatus for imaging an object at a vision station to develop dimensional information associated with the object by projecting a beam of controlled light at the object and detecting the position of the laser spot in the image plane.

BACKGROUND ART

In many machine vision applications, changes in depth can provide much of the information for inspection, especially in cases where the grey scale or intensity contrast is poor, difficult to predict or irrelevant. In fact, it has been suggested that most industrial vision applications are inherently three-dimensional and that two-dimensional problems rarely exist. SMD (surface mounted device) inspection is a good example of an application where depth detection could be very useful for determining the presence and orientation of components. Otherwise, special case engineering is usually involved to handle varying component color, texture and background. Even with standard circuit inspection techniques, some capability for depth perception is desirable. For example, when operators inspect with a stereo microscope both color and depth perception capabilities are utilized.

Depth detection techniques are categorized as passive when a controlled source of radiation is not required, or active if a beam of radiant energy is involved. Passive ranging techniques avoid putting constraints on the observed objects or their environment and, consequently, have been the subject of much research in both computer vision and psychophysics. Methods based on stereo disparity, camera motion, surface reflectants, texture gradients, shadows and occlusions have been explored. These techniques often have psychophysical correlates. For example, depth perception in the human visual system is believed to be based upon these types of cues.

One disadvantage of the passive approach is the extensive computation required for construction of a depth map. Methods based on stereo disparity and camera motion are potentially very powerful but require matching of corresponding features in a sequence of images. A method for consistently establishing the correspondence has not been developed at this time for real time computer applications. Nevertheless, several ideas have emerged from studies in depth perception, including techniques for representing the properties of surfaces.

Active depth detection techniques eliminate the correspondence problem and measure the depth directly by using a beam of energy and recording the time of flight (sonar and radar applications such as shown in U.S. Pat. No. 4,212,534). Depth may also be measured through displacement (triangulation and grid coding), phase shift of a laser beam compared to a reference beam (laser radar), or shadow length (directional illumination). Extensive computation for a depth map is avoided and the information processing task is reduced to extraction of three-dimensional features, representation of the surfaces and scene analysis operations. In the application where the use of intensity or color improve classification, both range and intensity data may be used.

The triangulation or structured light concept offers a great potential for acquiring a dense, high-resolution (approximately 1 mil and finer) 3-D image at high data rates (10 MHz) at a relatively low cost. The triangulation concept is one of the oldest depth detection techniques which exists, but which continues to undergo new developments. On the other hand, the laser radar approach is relatively new to machine vision. While the laser radar approach has some advantages, its relatively low data rate and high cost make this approach somewhat unwieldy for high resolution application; as the modulation frequency is increased to the GHz range, high resolution imaging becomes relatively difficult to implement in a cost-effective way. By contrast, the triangulation method is relatively simple and has an inherently high resolution capability.

Many of the refinements of the basic triangulation concept involve projection of single and multiple stripes (grid patterns), scanning strip systems and flying spot scanners. One 3-D vision system utilizing structured light is described in U.S. Pat. No. 4,105,925. The vision system described therein includes a linear array sensor which is positioned so that a line of light is visible only if a reference plane is illuminated. If an object is present, then the light beam is broken. A second line source is used to minimize shadows. As the object is scanned with a linear sensor, a binary image is produced and the presence and orientation of the object is then determined.

One commercially available 3-D vision system which produces height measurements includes a microprocessor-based, laser line sectioning system. The system is capable of producing 60 fields of 480 x,y,z coordinates each second which corresponds to approximately 30 KHz data rate. Each line of data requires acquisition of an entire video field. If a one-half inch by one-half inch object is to be imaged at one mil, x,y,z resolution then the maximum speed of the object conveyed on a conveyor belt for 100% inspection of the part is approximately 30 seconds per inch.

Such a single stripe system is most useful in gauging and spot checking and the use of multiple stripes in such a system are best for highly constrained scenes which are not likely to change very often. These systems are mostly used for gauging rather than for image processing and 100% inspection. Proper sampling and acquisition of dense three-dimensional information requires the stripes to be scanned across the object and imaged with an array camera or line sensor, either of which can limit the data rate. Tradeoffs between speed, resolution and dynamic range are a necessary consequence of the use of a multiple stripe system.

One method for acquiring data in a 3-D vision system is to replace the line scan or array sensor utilized in most 3-D vision systems with a lateral effect photodiode as illustrated in U.S. Pat. No. 4,375,921. The ambiguities which might exist in multiple stripe systems are not a problem with this technique and the measurement range variation is relatively large. This is true because the entire detector surface is available and there is no requirement to share the detector area as in a multiple stripe system.

Unfortunately, the bandwidth of most of the devices with amplification circuitry is well below one MHz. Dual detector devices (i.e. bi-cells) which have a 30 MHz bandwidth are available but standard devices are not useful in the basic triangulation concept for imaging under low light conditions at high speed, particularly when large fields of view are examined. These devices are also very sensitive to spot shape and geometric distortions.

U.S. Pat. Nos. 4,068,955 and 4,192,612 disclose a thickness measuring device utilizing well-known trigonometric principles to generate data to give the distance to or the thickness of a remote object. In such thickness gauging systems, beams of light are directed through beam-splitting mirrors to opposite surfaces of the object to be measured. By ascertaining the relative angles of incidence and reflection with respect to the object surface, suitable trigonometric rules can be applied to generate the approximate thickness of the object in question.

U.S. Pat. No. 4,472,056 discloses a shape-detecting apparatus for detecting three-dimensional products or parts such as soldered areas of a printed circuit board, the parts attached to the printed board and bumps in an LSI bonding process. The apparatus comprises a slit projector for projecting a slit bright line image forming lens for forming the bright line image. The apparatus also comprises an image scanning mechanism for the bright line image formed through an image forming lens in a height direction of the object and a one-dimensional image sensing device for self-scanning the bright line image formed therein with an array of image sensing elements orthogonal to the scanning direction by the image scanning mechanism. This system is severely limited by readout time; each 3-D point requires examination at many photodetectors.

U.S. Pat. No. 4,355,904 discloses a device for measuring depth using a pair of photodetectors such as photodiodes and a partially reflective and a partially transmissive filter. The computation of the centroid is done by an analog divider.

U.S. Pat. No. 4,553,844 discloses a method and system in which a spot beam scans an object in one direction and the resulting spot image is detected through observation in a direction transverse the one direction.

U.S. Pat. No. 4,645,917 discloses a swept aperture flying spot profiler. The sensor used in the system is either a photomultiplier or an avalanche diode.

U.S. Pat. No. 4,349,277 discloses a parallax method of wavelength labeling based on optical triangulation. A signal processor calculates a normalized signal that is independent of surface reflectivity and roughness variations.

U.S. Pat. No. 4,634,879 discloses the use of optical triangulation for determining the profile of a surface utilizing two photomultiplier tubes in a flying spot camera system. These are arranged in a "bi-cell" configuration. As an anti-noise feature, amplitude modulation is impressed upon the laser beam and a filter network is used to filter photomultiplier response so as to exclude response to background optical noise.

Other United States patents of a more general interest include U.S. Pat. Nos. 4,053,234; 4,065,201; 4,160,599; 4,201,475; 4,249,244; 4,269,515; 4,411,528; 4,525,858; 4,567,347; and 4,569,078.

DISCLOSURE OF THE INVENTION

An object of the present invention is to provide an improved method and system for high speed, 3-D imaging of an object at a vision station wherein extremely high speed and sensitivity can be obtained by using photodetectors and a relatively simple and low cost signal processing circuitry having a large dynamic range to develop dimensional information associated with the object.

Another object of the present invention is to provide a method and system for imaging an object at a vision station which overcomes many of the limitations of the prior art methods and systems by optically preprocessing the reflected light signal by a set of optical components which improve the quality of the data collected.

Yet still another object of the present invention is to provide a method and system for imaging an object at a vision station to develop high resolution, dimensional information associated with the object in a relatively inexpensive and compact fashion and which system can be interfaced with standard, video-rate apparatus.

In carrying out the above objects and other objects of the present invention, a method is provided for the high-speed, 3-D imaging of an object at a vision station to develop dimensional information associated with the object. The method comprises the steps of scanning of controlled light at the surface of the object at a first predetermined angle to generate a corresponding reflected light signal, receiving the reflected light signal at a second angle with a set of optical components, spatially filtering and smoothing the received signal and optically splitting the received light signal into first and second split beams, the second split beam being a reference beam. The method further comprises the steps of measuring the amount of radiant energy in the first split beam and the reference beam and producing corresponding first and second electrical signals proportional to the measurements, normalizing the first and second electrical signals to lie within a predetermined range, and computing a centroid value for the first split beam from the normalized signals.

Further in carrying out the above objects and other objects of the present invention, an imaging system for the high-speed, 3-D imaging of an object at a vision station to develop dimensional information associated with the object is provided. The system comprises a source for scanning a beam of controlled light at the surface of the object at a first predetermined angle to generate a corresponding reflected light signal and a set of optical components for receiving the reflected light signal at a second angle, for spatially filtering and smoothing the received signal and for optically splitting the received light signal into first and second split beams, the second split beam being a reference beam. The system further comprises first and second measuring means for measuring the amount of radiant energy in the transmitted portion of the first split beam and the reference beam, respectively, and producing first and second electrical signals proportional to the measurements, respectively. Signal processing means normalizes the first and second electrical signals to lie within a predetermined range and computes a centroid value for the first split beam from the normalized signals.

Preferably, the method described above includes the step of imaging the first and second light beams to first and second adjacent positions, respectively, prior to the step of measuring.

Also, in one construction of the imaging system, the source is preferably a laser scanner, the set of optical components preferably includes components for optical filtering and position detection, and the first and second measuring means each includes a highly sensitive photodetector for converting the radiant energy in its respective split beam into an electrical current.

The advantages accruing to the method and system as described above are numerous. For example, such an imaging system can be incorporated into an inspection/gauging product wherein both range and intensity data are acquired. Inspection of stationary large objects at high resolution can be performed utilizing a line scan configuration.

Also, such a method and system provide high resolution, video rate, full 3-D imaging at a relatively low cost. Such method and system also provide imaging at low light levels with high-speed circuitry to accommodate a large dynamic range.

The present invention overcomes many of the problems of the prior art by (1) spatial smoothing to reduce erroneous readings within a position-sensitive filter, including a cylindrical element for spot/line conversion; (2) including a programmable mask for rejecting multiple scattered light; (3) a high-speed signal processor with wide dynamic range with feedback to modulate the laser source if necessary; (4) use of detectors which allow shot noise performance to be achieved; and (5) modulation of laser source for reduction of noise bandwidth.

Also, a feedback arrangement is incorporated herein which could be used to extend dynamic range by first acquiring a line of intensity data which is buffered and used to modulate laser amplitude on the subsequent line. Spatial registration is maintained through use of two laser diodes which are precisely offset.

Preferably, TTL modulation is used herein and allows for separate signal processing operations to be performed during the "on" and "off" intervals.

The objects, features and advantages of the present invention are readily apparent from the following detailed description of the best mode for practicing the invention when taken in connection with the accompanying drawings.

BEST MODE FOR CARRYING OUT THE INVENTION

Figure 1:
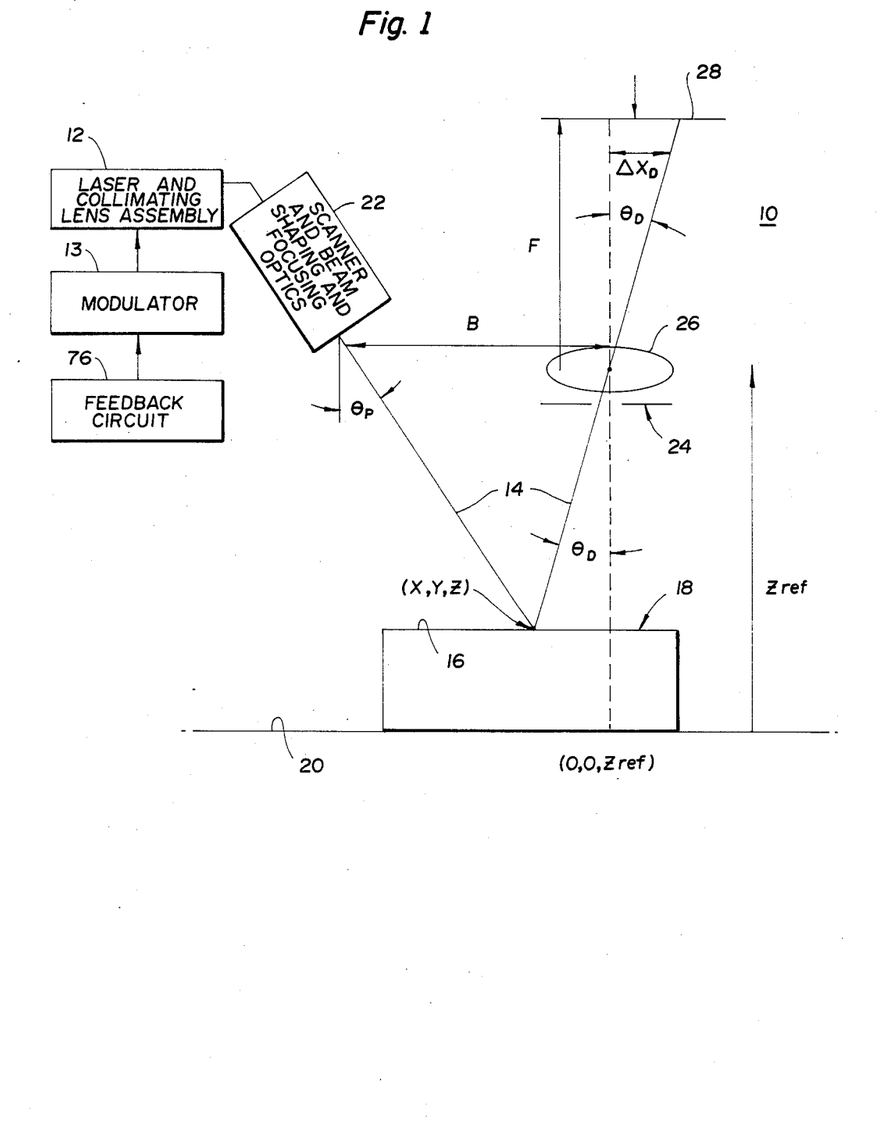
FIG. 1 is a schematic view illustrating the basic triangulation or structured light concept.

Referring now to FIG. 1, there is illustrated the major components of a basic 3-D imaging system, collectively indicated at 10. The system 10 is positioned at a vision station and includes a controlled source of light such as a laser and collimating lens assembly 12 and a scanner and beam shaping and focusing optics 22 for projecting a series of laser beams 14 at the reflective surface 16 of an object, generally indicated at 18. The object 18 is supported on a reference, planar surface 20 at the vision station.

Figure 2:
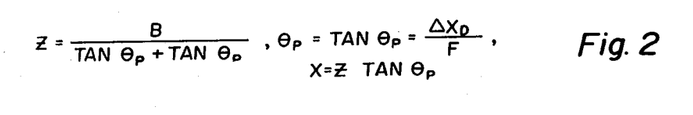
FIG. 2 is an illustration of two mathematical formulas interrelating various variables illustrated in FIG. 1.

Referring now to FIG. 2 in combination with FIG. 1, there is also illustrated the basic triangulation or structured light concept including formulas for interrelating the various variables depicted in FIG. 2. Basically, the height Z of the object 18 is computed from the projection angle, $\theta_p$, and the deflection angle, $\theta_d$, at which the reflected beam is incident upon detector element 28 of a detector 24.

The prior art typically shows a plurality of detector elements which may comprise a linear array or array sensor or, if a single detector element is provided, may comprise a lateral effect photodiode or bi-cell (dual photo diodes). Dual photodiodes have been used as position sensing devices and are capable of measuring very small depth changes over a limited height range.

Although these systems can obtain quite accurate z measurements with lateral effect photodiodes (LEP), the internal resistance of the diode (which provides the depth sensing and centroid computation capability of the LEP through attenuation of a signal currents) also introduces a noise current which is high enough to become the dominant source of noise in the imaging system. This includes the noise in the dark current which is quite high together with the Johnson noise created by the resistor. For example, a good quality commercially available LEP will produce a noise current which is about an order of magnitude higher than a silicon photodiode with the same area. When compared to the sensitivity of photomultipliers or avalanche detectors the LEPs are very slow yet the PM tubes and APDs are orders of megnitude more sensitive to light. The resistance and the capacitance of the LEP device introduce bandwidth limitations. The preferred depth sensing technique described herein derives position of the light spot centroid through attenuation of light intensity and can be considered the electro-optic counterpart of a lateral effect photodiode but high-speed detectors optimized for sensitivity can also be used.

The sensitivity of the basic triangulation concept depends upon the baseline to height ratio and decreases for steep illumination and viewing angles. The sensitivity also depends upon the spacing between the detector element 28 and the effective focal length of the focusing lens 26 of the detector 24. Increasing the distance of the detector element 28 from the lens 26 increases the sensitivity.

Scanning methodologies described as "synchronous scanning", or "telecentric scanning", "descanning", allow for considerably relaxation of this tradeoff. Using such geometries allows high resolution depth measurements at steep angles. These scanning geometries can also be used with the position sensing and signal processing system described herein without other modifications. The performance of the system of the invention can be further enhanced with such geometries.

In the configuration illustrated in FIG. 1, the effects of shadows and occlusions (i.e. invisible areas to the detector) are a concern and can limit the achievable range resolution. For high precision gauging of relatively flat surfaces such as solder paste volume, ink thickness, surface flatness etc., and illumination angle of 30° will typically give the most precise results and occlusion effects will usually be insignificant. For applications where the size and shape of the objects to be imaged have a relatively large variation, such as found on many types of circuit boards, illumination angles of 10 to 15 degrees will be desirable. Missing point problems can be reduced with multiple detectors or with autosynchronized geometries to view within 10 degrees.

The laser 12 and scanner 22 of the present invention preferably define a flying spot laser scanner. The laser 12 is coupled to a modulator 13 to shift the information to a higher frequency where system noise characteristics are better. THe modulator 13 may perform one of many types of modulation, including sine wave, pulse amplitude, pulse position, etc. Preferably, the laser 12 is a solid state laser diode and is "shuttered" with a TTL signal (i.e. TTL modulation). In this way, the laser signal is encoded so as to allow separate signal processing functions to be performed during "on" and "off" intervals as described in detail hereinbelow. Typically, power levels are 20–30 nW (Class III-B) which are well suited for machine vision applications.

Three types of scanners 22 may be utilized: spinning polygon (x-scan) and galvonometer (y-scan) mirrors; linearized resonant scanner (x-scan) and galvonometer (y-scan); or acousto-optic cell (x-scan) and galvonometer (y-scan). Preferably, the scanner 22 comprises the latter acousto-optical system because no moving parts are required and the retrace time is very fast. Either of the sensors can be used in conventional triangulation-bases sensing systems having a relatively large baseline-to-height ratio or in narrow angle triangulation systems which utilize telecentric or auto-synchronized scanning methods.

Another convenient method for inspecting large areas is linear scanning. In this method the object or projection system is translated and the galvonometers (y-scan) are not needed.

Figure 3:
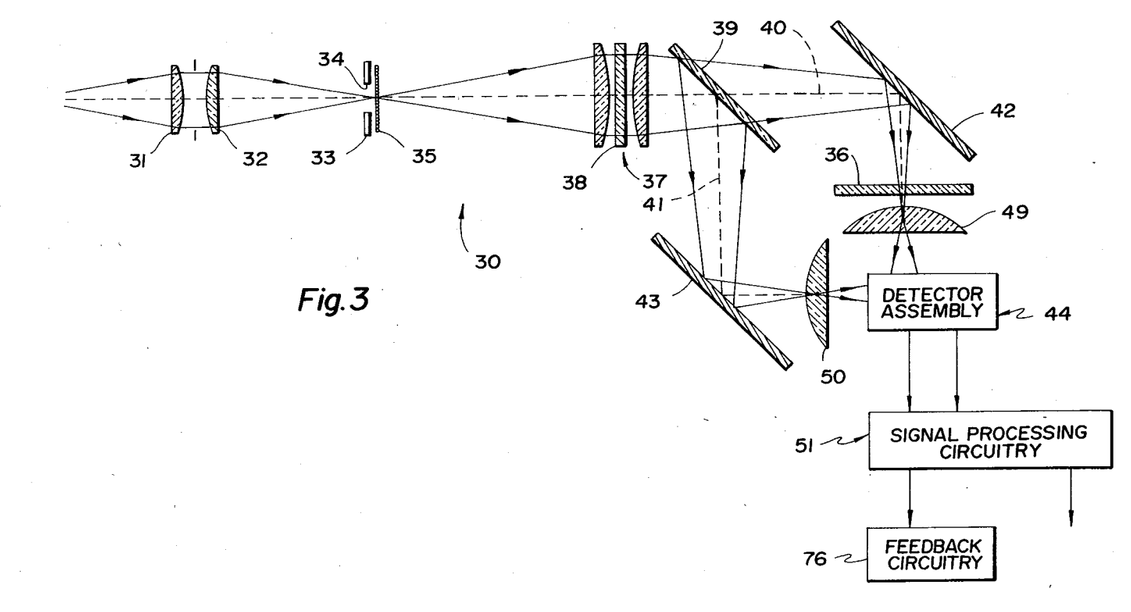
FIG. 3 is a schematic view of a set of optical components, detector assembly and signal processing circuitry for use in the method and system of the present invention.
Figure 4:
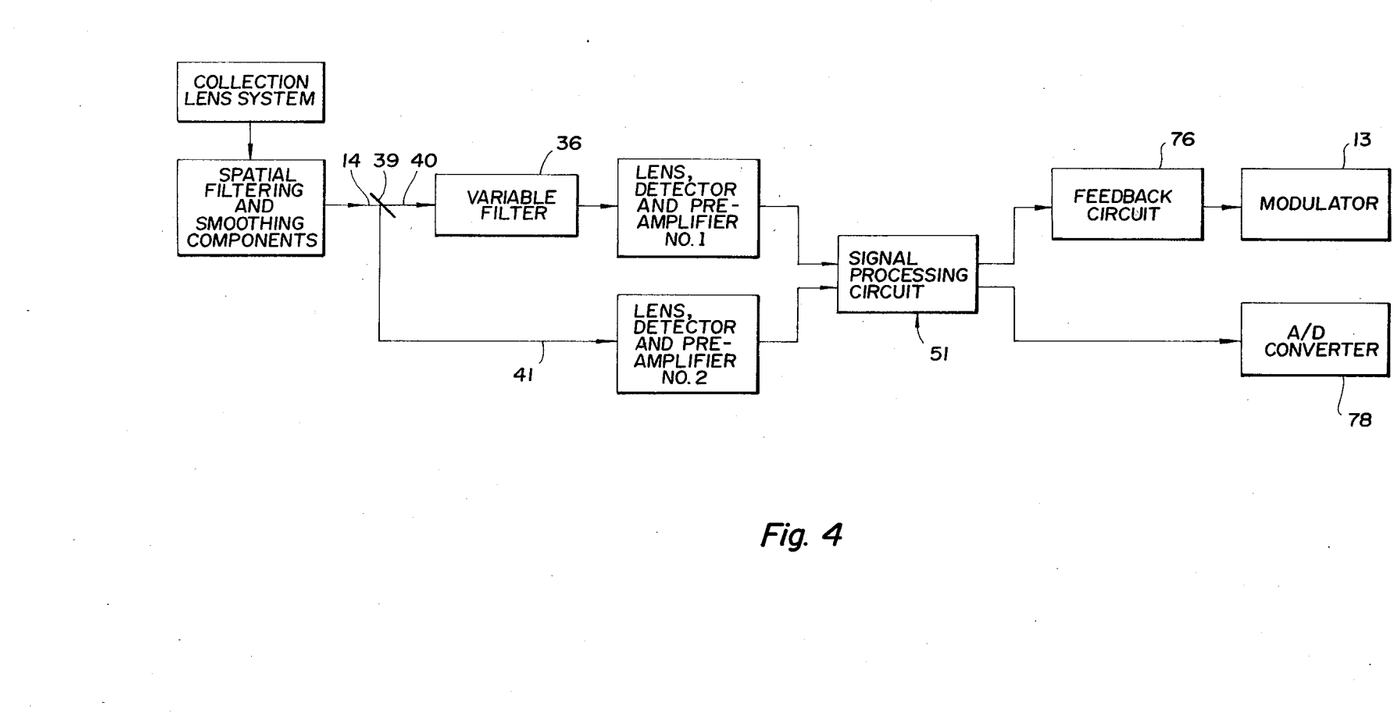
FIG. 4 is a signal processing block diagram illustrating the method and system of the present invention.

Referring now to FIG. 3, there is generally indicated at 30 an optical system for use in the imaging system of the present invention. The optical system 30 includes a set of optical components, including an objective lens 31 to collect scattered light from the object and a second diffraction limited lens 32 to focus the collected light onto an intermediate image plane. The lenses 36 and 32 are conventional. However, each of the lenses 31 and 32 operates at a preferred conjugate. The second lens 32 can be interchanged to accommodate various reduction and magnification ratios.

The system 30 also includes a mask 33 which, in one embodiment, forms a rectangular aperture 34 (i.e. spatial filter) positioned at the intermediate image plane to reject background noise (i.e. stray light) which arises from secondary reflections from objects outside of the desired instantaneous field of vision of the system. The mask 33 may be affixed aperture or electromechanical shutter, or, preferably, is a liquid crystal, binary, spatial light modulator which is dynamically reconfigured under software control Such a configuration is useful for inspection of very shiny objects (reflowed solder, wire bond, loops, pin grids, etc.) which are in close proximity from which multiple reflections will be created. When used with auto-synchronized scanners or in a telecentric scanner (rotating mirrors have moving mechanical parts), the mask 33 is a narrow strip which allows for collection of only the light which is useful for z measurement. If desired, the spatial filter or strip can be programmed in a chosen pattern of opaque and transmissive patterns correlated with the height profile of the object to be detected. For example, a height measurement of shiny pins placed on a shiny background will be more reliable if only a narrow strip corresponding to the height range over which properly positioned pins is viewed. Multiple reflections may produce a signal return which is significantly larger than the return produced by useful light. If properly placed, the position of the pin will be reported. If defective, no pin will be found.

When a conventional triangulation based scanner is used (i.e. a solid state device having no moving parts but an area detector) the aperture 34 of the mask 33 is no larger than necessary for detection of a specified height range, but is still programmable.

A fine grained ground glass diffuser 35 of the system 30 is located adjacent the intermediate image plane to create a relatively uniform and relatively broad spot of light. Fluctuations in the measured position of the spot as a result of directional scattering or from local variations in a variable filter 36 of the system 30 are spatially averaged and therefore minimized. THis is analogous to low pass filtering in electronic systems.

The variable filter 36 which is utilized as a position dependent transmission device produces a measurement of spot centroid location and is relatively insensitive to focus and the shape of the intensity distribution.

The variable filter 36 can be fabricated with a transmission function which is linear with position or as a filter which has a linear density characteristic (i.e. logarithmic transmission with position). A nonlinear computation approach has a property which allows for compression/expansion of the depth sensitivity throughout the range. In particular, the filter 36 can be utilized in such a was as to allow small height changes to be sensed near the baseline (the most distant z coordinate) without compromising the depth sensitivity on taller objects. Since the primary use of the filter 36 is as a variable density device, this nonlinear computation is accomplished with a relatively standard type of filter. On the other hand, if linearity of the z measurement is of importance the linear transmission function should be used.

The system 30 further includes a second lens system, generally indicated at 37, which is used to reduce or magnify the intermediate image and transmit (relay) the image through the system 30. A cylindrical lens 38 allows for additional spatial averaging over the surface of the variable filter by converting the spot of light into a line (i.e., changing aspect ratio).

A beamsplitter 39 is used to produce a reference split beam or signal and another split beam which is transmitted to the filter 36. The first split beam is transmitted to the filter 36 in a first channel 40 and the second or reference split beam is transmitted in a second channel 41. The second channel 41 provides an intensity reference to normalize the data and eliminate the dependence of the height measurement on brightness.

If desired, the system 30 can also be fabricated in such a way as to allow both the reference beam and transmitted beam to be produced by a linear variable filter with a metallic coating on its front surface to produce spatial reflection, thereby allowing for splitting and position dependent attenuation with a single optical component.

If the beamsplitter transmission/reflection ratio is precisely known and is of a constant value, position is determined by simply dividing (ratio detection) the voltages obtained on the two channels. That is to say that $Z = V1/V2$. Otherwise, the position is found by $Z = V1/(V1+V2)$ (i.e. this latter computation is more robust).

A folding mirror system, including mirrors 42 and 43 are used to deliver the light beams to a localized area of a detector assembly, generally indicated at 44. The connection between the photodetectors 45 and 46 and their associated pre-amplifiers 47 and 48 should be as short as possible to minimize stray capacitance for high-speed applications and to avoid mismatches between the signal channels. Constant deviation prisms can also be used in place of the mirrors 42 and 43 to simplify system alignment. The short wire lengths are necessary so that the low level signals are not corrupted by noise.

The laser light signal transmitted by the filter 36 and the light signal reflected by the mirror 43 are imaged by conventional field lenses 49 and 50, respectively, onto consistent, predetermined areas on a pair of photodetectors, 45 and 46 of the assembly 44. The assembly 44 also includes pre-amplifiers 47 and 48, respectively for the photodetectors. Each of the photodetectors is preferably a small area photodiode (i.e. no larger than 3 mm×3 mm) having low capacitance and very high shunt resistance, photomultiplier, avalanche photodiode or intensified detector of a detector element and pre-amplifier combination. Such a photodiode preferably has at least 300 MHz cutoff frequency, corresponding to rise times of 1 nanosecond or less. The high speed, low noise pre-amplifier part of the combination operates at video rates.

Since a single sensitive detector is used for each channel 40 or 41, sensitivity of the assembly 44 is extremely high and the noise is very low when compared to LEP's. Also, since the photodetector/amplifier gain bandwidth product is very high, large signals may be obtained for relatively small changes in signal levels.

An "optical bi-cell" can be formed with a slight modification of the arrangement in FIG. 3. This is done by eliminating the variable filter 36 and introducing a slight position offset of the photodetectors 45 and 46.

The bi-cell detector is useful for obtaining good height resolution when only a narrow range must be sensed (e.g. traces on circuit board, flatness detection, etc.) and is a complementary approach to the variable density filter 36 which provides high resolution over a relatively large depth of field and a direct measurement of the light spot centroid position.

The spatial averaging obtained with the diffuser 35 is required, in general, to make the bi-cell approach robust because measurement errors will be introduced for non-uniform intensity distributions which result from scattering or from geometric (angular) distortions.

As previously mentioned, the signal representing the height of the object to be inspected is determined from the ratio $Z = V_1/(V_1 + V_2)$ whereas the intensity information is given by $I = V_1 + V_2$. For determination of Z, a commercially available analog divider can be used to determine the ratio at speeds approaching video frame rates. Such dividers, however, require the sum of $V_1 + V_2$ (denominator) vary over only a small range (typically 3:1) if high accuracy is to be maintained. A typical scene to be imaged will contain reflectivity variations which are much greater than this range. For instance, printed circuit board components and backgrounds will produce $V_1 + V_2$ signals which vary by a few orders of magnitude representing the approximate useful diffuse reflectivity variations from 0.5% to 100%. In addition, specular returns will produce a much larger variation and must be identified since the resulting Z value is incorrect, whereas very low photon limited signal returns almost result in division by 0.

Other long standoff applications may require a much larger dynamic range because of variations in standoff. In such cases, real time laser intensity modulation is necessary.

As discussed above, the dynamic range of the measuring system is sufficient to accommodate diffuse reflectivity variations from a fraction of a percent to 100% (e.g., substantially greater than the full range of black to white given on standard greyscale test charts). In some applications, primarily where a large depth of range must be sensed, it may be necessary to implement further extensions allowing the system to measure very weak returns from dark distant objects and strong returns from bright objects in close proximity. The vision system in such an application (i.e. robot navigation) must have a much larger dynamic range than what is required for inspection of small, quasi-flat objects like circuit boards.

The system described can be modified to accommodate extended synamic range requirements through feedback to increase or decrease the laser power dependent upon the intensity measured from some point on the object. However, with such an arrangement a necessary decrease in the data rate (at least a factor of two) must result and, more importantly, caution must be exercised so that the reflectance measurement corresponds to the exact same physical point on the object as the z measurement. Nevertheless, now that high power laser diodes are commercially available with source powers of up to 1 W with very fast rise times, it is feasible to implement a feedback circuit in a practical configuration. A source power of 1 W would enable the system to measure objects which return signal levels approximately 50X lower than can be measured with the low cost, 20 nw laser diode as previously described. Also, dual laser diodes of low and medium power which are precisely offset from each other are now commercially available. Primary application of such dual diodes has been in inspection of optical disks using a "read after write" technique. In many applications a medium power laser produces sufficient signal to noise and these devices can be used. The advantage of not requiring additional opto-mechanical hardware to maintain near-perfect registration between the means is also significant.

Such a feedback arrangement can be implemented with "look ahead" capability in the sense that data from the low power laser diode is buffered and subsequently used by a feedback circuit 76 to control the modulation of the high power laser diode by means of pulse amplitude modulation. An acousto-optic light modulator instead of the modulator 13 is preferred over direct time varying amplitude laser modulation for maintaining stability of the laser source and this device can be regarded as a high-speed, electro-optic shutter.

Figure 5:
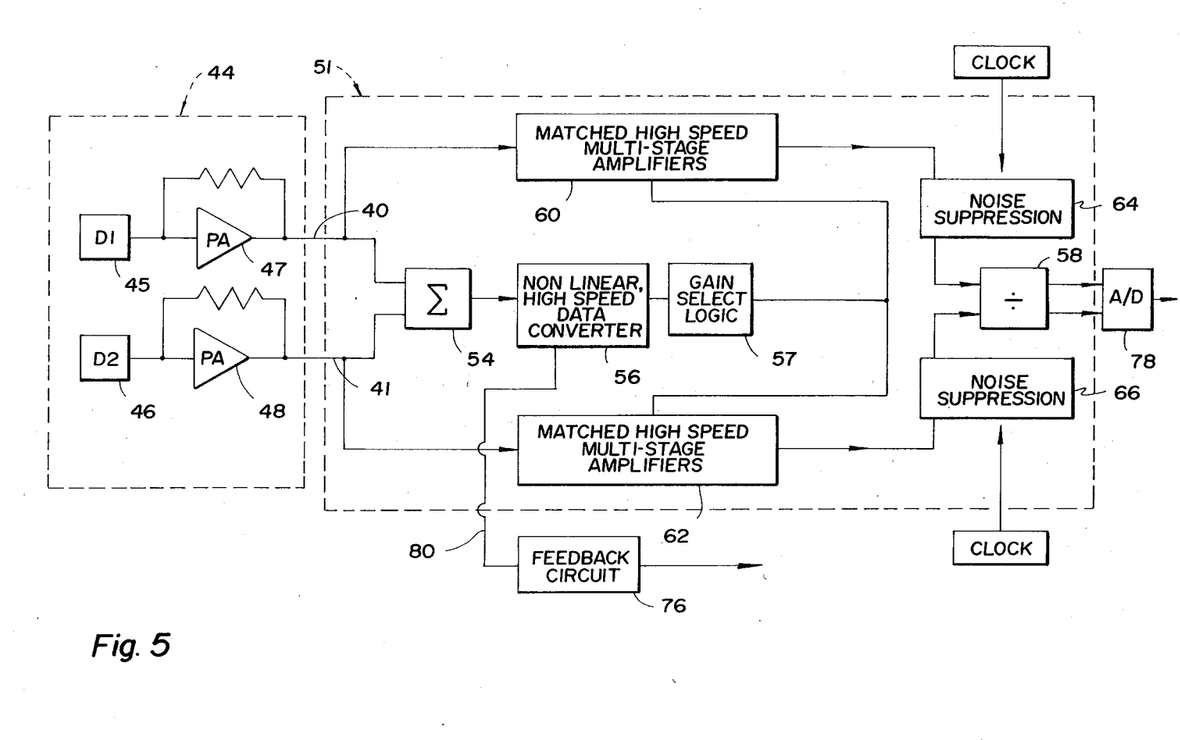
FIG. 5 is a detailed schematic diagram of the signal processing circuitry of FIG. 3.

Referring now to FIG. 5, there is generally indicated at 51 signal processing circuitry or unit which expands/compresses the variable data in order to obtain the proper Z value and also generates special values indicating incorrect height information.

The preamplifiers 47 and 48 convert the signal currents $I_1$, $I_2$ of the photodetectors 45 and 46, respectively, to corresponding voltages. The sum $V_1 + V_2$ is then formed as an analog signal by a summing circuit 54 and then converted into digital form by a non-linear data converter 56 which operates at very high speeds. The purpose of converting the data to digital form is to provide an easy method of selecting the gain values (inverse function) required to scale $V_1+V_2$ into the approximate 3:1 range required by an analog divider of circuitry 58. The idea is similar to that used in AGC (automatic gain control) circuits except that AGC circuits often average the signals for prohibitively long periods and feedback the gain control value which reduces the system bandwidth. The output of the converter 56 is fed into a gain select logic circuit 57 to provide output signals without feedback. The gain value selected with the logic circuit 57 are used to "program" a series of high precision amplifier stages 60 and 62 for selecting the gain values to scale the signal $V_1+V_2$ into the 3:1 range.

As previously mentioned, modulation of the laser source is used to shift the information to a higher frequency where system noise characteristics are better. The circuitry 51 includes noise suppression circuits, generally indicated at 64 and 66, for the first and second channels 40 and 41, respectively.

Figure 6:
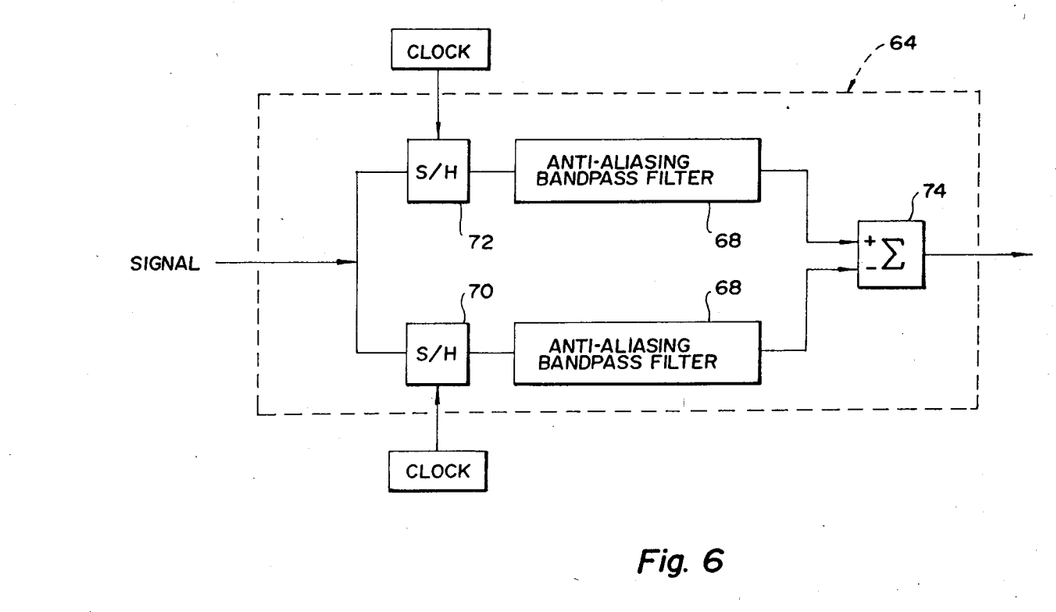
FIG. 6 is a detailed block diagram of the noise suppression circuit of FIG. 5.

During the "on" time of the laser source 12, a first anti-aliasing filter 68 of each noise suppression circuit 64 or 66 (as shown in FIG. 6) is applied to smooth out signals variations (high frequency noise) thereby rejecting out-of-band noise. This high frequency noise is rapidly varying compared to the known (modulated) signal. During the "off" time these rapid variations are also removed by a second anti-aliasing filter 68. A demodulation step is performed to reject low frequency noise with sample and hold circuits 70 and 72. Because the low frequency noise is slowly varying compared to the clock rate of the system an average value is obtained by the circuit 70 during the "off" period to provide a reference voltage which is subtracted by a circuit 74 from the "on" voltage value obtained by the circuit 72 to cancel low frequency components. Suppression of the low frequency (1/f, 60 cycle etc.) noise is important to maintain a large dynamic range.

This noise suppression also has the major advantage or providing a "black level reference" for each picture element which is not possible in conventional video systems. Black reference avoids DC offset drift in the signal processing chain. As a result, the fidelity of the signal is dramatically improved. A by-product of the method is an automatic calibration feature. The laser power is controlled with the circuit 13 in such a way that slow term drift in the light level is negligible, thereby establishing a "white reference". Since the black reference is established for each pixel the entire light range is calibrated on a pixel by pixel basis.

Thereafter, the signal from the circuitry 51 is preferably amplified and coupled to an analog-to-digital converter 78 which, in turn, may be interfaced to a conventional video frame grabber of a larger inspection/gauging product.

With further reference to the feedback circuit 76 and the signal processing circuit 51, the intensity signal $V1+V2$ associated with object point is quantized as before by the non-linear data converter 52 of the circuitry 51 which includes additional outputs 80 for data values outside of the previous range. These digital values are buffered and through a delay line arrangement within the feedback circuit 76 provide the data necessary to control the modulator 13 so that the appropriate power level is provided to the surface so that the modified $V1+V2$ signal is in the range of the pre-scalers 60 and 62, noise suppression circuits 64 and 66, and the divider 58.

The range of the non-linear data converter 56 described herein can be extended to accommodate an arbitrarily large range within practical requirements of cost, circuit board space, speed requirements, and laser power range. The result of this implementation is identical to the previous (3D+greyscale system), except that the 3D data is delayed with respect to the intensity data by a constant known offset. A practical choice is to acquire alternating lines of intensity and depth information.

The above-described imaging method and system present numerous advantages. For example, imaging can be performed at high resolution and at video rates to obtain full 3-D information. Also, such a method and system offer the potential of accurate video frame rate depth sensing at low cost.

Finally, the detection method can be applied to several 3-D imaging geometries in addition to the standard triangulation techniques illustrated in FIGS. 1 and 2. For example, it has been suggested in research literature that shadows and occlusion can be completely avoided by using a quite simple but clever method utilizing a nearly coaxial illumination beam, light collection system and a CCD detector array. The optical system is a good one, but the detector again severely limits speed, and is incapable of responding to low light levels since the required optical system is inherently inefficient due to a mask which is largely opaque. By incorporating, with minor modifications, the system disclosed in this invention, high speed 3-D sensing at low light levels can be achieved with only a slight increase in the physical size of the optical package.

While the best mode for carrying out the invention has been described in detail, those familiar with the art to which this invention relates will recognize various alternative ways of practicing the invention as defined by the following claims.

What is claimed is:

1. A method for the high-speed, 3-D imaging of an object at a vision station to develop dimensional information associated with the object, the method comprising the steps of:
    scanning a beam of controlled light at the surface of the object at a first predetermined angle to generate a corresponding reflected light signal;
    receiving said reflected light signal at a second angle with a set of optical components;
    spatially filtering the received signal;
    spatially averaging the received light signal with the set of optical components to compensate for non-uniform intensity distributions in the received signal, said step of averaging including the step of creating a uniform spot of light;
    optically splitting the received light signal into first and second split beams, the second split beam being a reference beam;
    imaging the first and second split beams to first and second predetermined measuring areas of first and second photodetector means, respectively, to produce corresponding first and second electrical signals proportional to the measurements;
    normalizing the first and second electrical signals to lie within a predetermined range; and
    computing a centroid value for the first split beam from the normalized signals.

2. A method for the high-speed, 3-D imaging of an object at a vision station to develop dimensional information associated with the object, the method comprising the steps of:

scanning a beam of controlled light at the surface of the object at a first predetermined angle to generate a corresponding reflected light signal;

receiving said reflected light signal at a second angle with a set of optical components;

spatially filtering the received signal;

spatially averaging the received light signal with the set of optical components to compensate for non-uniform intensity distributions in the received signal, said step of averaging including the step of creating a uniform spot of light;

optically splitting the received light signal into first and second split beams;

transmitting a portion of the first split beam dependent on the second angle;

imaging the first and second split beams to first and second predetermined measuring areas of first and second photodetector means, respectively, to produce corresponding first and second electrical signals proportional to the measurements;

normalizing the first and second electrical signals to lie within a predetermined range; and computing a centroid value for the first split beam from the normalized signals.

3. The method as claimed in claim 1 or claim 2 wherein said step of normalizing includes the step of summing the first and second electrical signals to obtain a resultant signal wherein the resultant signal is normalized to lie within the predetermined range, and wherein the centroid is computed from the normalized sum.

4. The method as claimed in claim 1 or claim 2 wherein the first and second electrical signals have an analog representation and wherein said step of normalizing further includes the steps of generating a digital representation of the first and second electrical signals and utilizing the digital representation to scale the first and second electrical signals to lie within the predetermined range.

5. The method as claimed in claim 4 further comprising the steps of modulating the beam of controlled light to shift the frequency of the controlled light to a predetermined band of frequencies and demodulating the first and second electrical signals.

6. THe method as claimed in claim 5 wherein the step of demodulating includes the step of removing noise from the first and second electrical signals with a filter having a transmission band including the predetermined band of frequencies.

7. The method as claimed in claim 1 or claim 2 wherein said step of spatially filtering utilizes a programmable mask correlated with a height profile of the object at the vision station.

8. The method as claimed in claim 1 or claim 2 wherein said step of spatially averaging includes the step of converting the spot of light into a line of light.

9. The method as claimed in claim 8 wherein the step of spatially filtering the received light utilizes a spatial filter of the set of optical components.

10. The method as claimed in claim 1 or claim 2 wherein at least one of said photodetectors is a photodiode having a measuring area of less than 20 mm$^2$.

11. A method for the high-speed, 3-D imaging of an object at a vision station to develop dimensional information associated with the object, the method comprising the steps of:

scanning a beam of controlled, modulated light at the surface of the object at a first predetermined angle to generate a corresponding reflected light signal;

receiving said reflected light signal at a second angle with a set of optical components;

spatially filtering the received light signal with the set of optical components;

spatially averaging the received light signal with the set of optical components to compensate for non-uniform intensity distributions in the received signal, said step of averaging including the step of creating a uniform spot of light;

optically splitting the received light signal into first and second split beams, the second split beam being a reference beam;

imaging the first and second split beams to first and second predetermined measuring areas of first and second photodetector means, respectively, to produce corresponding first and second electrical signals proportional to the measurements;

normalizing the first and second electrical signals wherein the step of normalizing includes the step of scaling the first and second electrical signals to lie within a predetermined range;

demodulating the scaled first and second electrical signals; and computing a centroid value for the first split beam from the demodulated signals.

12. An imaging system for the high-speed, 3-D imaging of an object at a vision station to develop dimensional information associated with the object, the system comprising:

a source for scanning a beam of controlled light at the surface of the object at a first predetermined angle to generate a corresponding reflected light signal;

a set of optical components for receiving the reflected light signal ta second angle, for spatially filtering the received signal, for spatially averaging the received light signal to compensate for non-uniform intensity distributions in the received signal, and for optically splitting the received light signal into first and second split beams, the second split beam being a reference beam said set of optical components including means for creating a uniform spot of light;

first and second photodetector means for measuring the amount of radiant energy in the first split beam and the reference beam, respectively, and producing first and second electrical signals proportional to the measurements, respectively;

means for imaging the first and second split beams to first and second predetermined measuring areas of first and second photodetector means, respectively; and signal processing means for normalizing the first and second electrical signals to lie within a predetermined range and for computing a centroid value for the first split beam from the normalized signals.

13. An imaging system for high-speed 3-D imaging of an object at a vision station to develop dimensional information associated with the object, the system comprising:

a source for scanning a beam of controlled light at the surface of the object at a first predetermined angle to generate a corresponding light signal;

a set of optical components for receiving the reflected light signal at a second angle, for spatially filtering the received signal, for spatially averaging the received light signal to compensate for non-uniform intensity distributions in the received signal, and for optically splitting the received light signal into first and second split beams, the set of optical components including transmitting means for transmitting a portion of the first split beam dependent on the second angle, said set of optical components including means for creating a uniform spot of light;

first and second photodetector means for measuring the amount of radiant energy in the transmitted portion of the first split beam and the second split beam, respectively, and producing first and second electrical signals proportional to the measurements, respectively;

means for imaging the first and second split beams to first and second predetermined measuring areas of first and second photodetector means, respectively; and signal processing means for normalizing the first and second electrical signals to lie within a predetermined range and for computing a centroid value for the first split beam from the normalized signals.

14. The system as claimed in claim 12 or claim 13 wherein the signal processing means includes a summing circuit for summing the first and second electrical signals to obtain a resultant signal wherein the resultant signal is normalized to lie within the predetermined range and wherein the centroid is computed from the normalized sum.

15. The system as claimed in claim 12 or claim 13 wherein the first and second electrical signals have an analog representation and wherein the signal processing means includes generating means for generating a digital representation of the first and second electrical signals.

16. The system as claimed in claim 15 wherein said signal processing means includes scaler means coupled to the generating means and utilizing the digital representation to scale the first and second electrical signals to lie within the predetermined range.

17. The system as claimed in claim 16 wherein said scaler means includes a set of programmable amplifiers for selectively amplifying the first and second electrical signals in response to the digital representation.

18. The system as claimed in claim 17 further comprising modulating means for modulating the beam of controlled light to shift the frequency of the controlled light to a predetermined band of frequencies and wherein said signal processing means includes a demodulator for demodulating the first and second digital signals.

19. The system as claimed in claim 18 wherein said demodulator includes a filter having a transmission band including the predetermined band of frequencies for removing noise from the first and second electrical signals.

20. The system as claimed in claim 12 or claim 13 wherein said set of optical components includes means for spatially filtering the received light signal including a programmable mask correlated with a height profile of the object at the vision station.

21. The system as claimed in claim 12 or claim 13 wherein said set of optical components includes a spot-to-line converter for converting the spot of light into a line of light.

22. The system as claimed in claim 21 wherein said means for spatially filtering includes a spatial filter for spatially filtering the received light.

23. The system as claimed in claim 12 or claim 13 wherein areas of the first and second photodiodes, respectively.

24. The system as claimed in claim 12 or claim 13 wherein each of said first and second photodetector means includes a single photodiode having a measuring area of less than 20 $mm^2$ for converting the radiant energy into an electrical current.

25. The system as claimed in claim 24 wherein each of said photodiodes has a measuring area of less than 10 $mm^2$.

26. The system as claimed in claim 12 or claim 13 wherein said set of optical components includes splitting means for optically splitting the received light signal into the first and second split beams.

27. The system as claimed in claim 12 or claim 13 wherein said source is a laser scanner.

28. The system as claimed in claim 27 wherein said laser scanner is a flying spot laser scanner.

29. An imaging system for the high-speed, 3-D imaging of an object at a vision station to develop dimensional information associated with the object, the system comprising:

a source for scanning a beam of controlled modulated light at the surface of the object at a first predetermined angle to generate a corresponding reflected light signal;

a set of optical components for receiving the reflected light signal at a second angle, the set of optical components including means for spatially filtering the received light signal, averaging means for averaging the received light signal to compensate for non-uniform intensity distributions in the received signal said averaging means including means for creating a uniform spot of light, and splitting means for optically splitting the received light signal into first and second split beams, the second split beam being a reference beam;

first and second photodetector means for measuring the amount of radiant energy in the first split beam and the reference beam, respectively, and producing first and second electrical signals proportional to the measurements, respectively;

means for imaging the first and second split beams to first and second predetermined measuring areas of first and second photodetector means, respectively; and signal processing means for normalizing the first and second electrical signals, said signal processing means including scaler means for scaling the first and second electrical signals to lie within a predetermined range and a demodulator for demodulating the first and second electrical signals to reduce noise in the signals, said signal processing means computing a centroid value for the first split beam from the demodulated signals.

30. A method for the high-speed, 3-D imaging of an object at a vision station to develop dimensional information associated with the object, the method comprising the steps of:

(a) scanning a beam of controlled light at the surface of the object at a first predetermined angle to generate a corresponding reflected light signal;

(b) receiving said reflected light signal at a second angle with a set of optical components;

(c) spatially filtering the received light signal with the set of optical components;

(d) spatially averaging the received light signal with the set of optical components to compensate for non-uniform intensity distributions in the received signal, said step of averaging including the step of creating a uniform spot of light;

(e) optically splitting the received light signal into first and second split beams, the second split beam being a reference beam;

(f) imaging the first and second split beams to first and second predetermined measuring areas of first and second photodetector means, respectively, to produce a corresponding pair of electrical signals proportional to the measurements;

generating a feedback signal dependent on the pair of electrical signals;

utilizing the feedback signal to control the modulation of a source of controlled light;

utilizing a beam of the controlled light in steps (a) through (f);

normalizing the second pair of electrical signals wherein the step of normalizing includes the step of scaling the second pair of electrical signals to lie within a predetermined range;

demodulating the scaled second pair of electrical signals; and computing a centroid value for the first split beam of the second pair of electrical signals from the demodulated signals.

31. An imaging system for the high-speed, 3-D imaging of an object at a vision station to develop dimensional information associated with the object, the system comprising:

a source including first and second sources for sequentially scanning first and second beams of controlled modulated light respectively, at the surface of the object at a first predetermined angle to generated corresponding reflected light signals;

a set of optical components for receiving the reflected light signals at a second angle, the set of optical components including means for spatially filtering the received light signal;

means for spatially averaging the received light signal to compensate for non-uniform intensity distributions in the received signal, said means for averaging including means for creating a uniform spot of light and splitting means for optically splitting each of the received light signals into first and second pairs of split beams, the second split beam being a reference beam;

first and second photodetector means for measuring the amount of radiant energy in the first split beams and the reference beams, respectively, and producing first and second pairs of signals proportional to the measurements, respectively, the first pair electrical signals corresponding to the first pair of split beams and the second pair of electrical signals corresponding to the second pair of split beams;

means for imaging the first and second split beams to first and second predetermined measuring areas of the first and second photodetector means, respectively, to produce corresponding first and second electrical signals proportional to the measurements;

feedback means for generating a feedback signal dependent on the first pair of electrical signals, the feedback means controlling the modulation of the second source to improve noise suppression and extension of the dynamic range of the system; and signal processing means for normalizing the second pair of electrical signals, said signal processing means including scaler means for scaling the second pair of electrical signals to lie within a predetermined range and a demodulator for demodulating the second pair of electrical signals to reduce noise in the signals, said signal processing means computing a centroid value for the first split beam of the second pair of split beams from the demodulated signal.

* * * * *

UNITED STATES PATENT AND TRADEMARK OFFICE
CERTIFICATE OF CORRECTION

PATENT NO. : 4,796,997

DATED : January 10, 1989

INVENTOR(S) : Donald J. Svetkoff et al

It is certified that error appears in the above-identified patent and that said Letters Patent is hereby corrected as shown below:

Column 2, Line 64 "measure-
    ment" should be --measurable--;
Column 6, line 25 "a signal
    currents" should be --signal currents--;
Column 6, line 36 "megnitude"
    should be --magnitude--;
Column 7, line 11 "THe" should
    be --The--;
Column 7, line 19 "nW" should
    be --mW--;
Column 8, line 20 "THis" should
    be --This--;
Column 8, line 33 "was" should
    be --way--;
Column 10, line 35 "nw" should
    be --mW--;
Column 13, line 47 (claim 6, line 1) "THe" should be --The--;

UNITED STATES PATENT AND TRADEMARK OFFICE
CERTIFICATE OF CORRECTION

PATENT NO. : 4,796,997

DATED : January 10, 1989

INVENTOR(S) : Donald J. Svetkoff et al.

It is certified that error appears in the above-identified patent and that said Letters Patent is hereby corrected as shown below:

Column 16, line 5
  in Claim 23 after the word "wherein" and before the word "areas" the following language was omitted --each said first and second photodetector means includes a single photodiode, said imaging means imaging the first and second split beams to first and second predetermined--; and Column 17, line 39 (Claim 31, line 10) "generated" should be --generate--.

Signed and Sealed this

Nineteenth Day of September, 1989

Attest:

DONALD J. QUIGG

Attesting Officer

Commissioner of Patents and Trademarks